US012781785B2

(12) United States Patent
Dlugosch

(10) Patent No.: US 12,781,785 B2
(45) Date of Patent: Nov. 3, 2026

(54) CLAMPING DEVICE

(71) Applicant: Industrilas i Nassjo Aktiebolag, Nassjo (SE)

(72) Inventor: Martin Dlugosch, Nassjo (SE)

(73) Assignee: INDUSTRILÅS I NÄSSJÖ AKTIEBOLAG, Nässjö (SE)

( * ) Notice: Subject to any disclaimer, the term of this patent is extended or adjusted under 35 U.S.C. 154(b) by 273 days.

(21) Appl. No.: 18/692,641

(22) PCT Filed: Sep. 14, 2022

(86) PCT No.: PCT/EP2022/075481

§ 371 (c)(1),
(2) Date: Mar. 15, 2024

(87) PCT Pub. No.: WO2023/041556

PCT Pub. Date: Mar. 23, 2023

(65) Prior Publication Data

US 2025/0137480 A1 May 1, 2025

(30) Foreign Application Priority Data

Sep. 16, 2021 (EP) .................................... 21197190

(51) Int. Cl.
*F16B 5/02* (2006.01)
*F16B 19/02* (2006.01)

(52) U.S. Cl.
CPC .............. *F16B 19/02* (2013.01); *F16B 5/025* (2013.01)

(58) Field of Classification Search
CPC ...... F16B 5/0084; F16B 5/025; F16B 5/0621; F16B 5/0628; F16B 5/0657; F16B 2/065;
(Continued)

(56) References Cited

U.S. PATENT DOCUMENTS

| | | | | | |
|---|---|---|---|---|---|
| 3,862,809 | A * | 1/1975 | Bodner | .................. | F16B 12/20 403/231 |
| 3,999,878 | A * | 12/1976 | Robinson | ................ | F16B 12/46 403/231 |

(Continued)

FOREIGN PATENT DOCUMENTS

| | | | | |
|---|---|---|---|---|
| DE | 202019106086 U1 * | 2/2021 | ............ | F16B 5/0635 |
| GB | 2431174 A | 4/2007 | | |
| WO | 2015006619 A1 | 1/2015 | | |

*Primary Examiner* — Amber R Anderson
*Assistant Examiner* — Zachary A Hall
(74) *Attorney, Agent, or Firm* — Volpe Koenig

(57) ABSTRACT

The present disclosure relates to a clamping device for aligning separate units in space. The clamping device including a first clamp element and a second clamp element, each adapted to be mounted to a respective separate unit. A locking element is adapted to press the first clamp element and the second clamp element towards each other along a locking axis. An alignment element is adapted to, when the locking element is pressing the first and second clamp elements towards each other, at least partially extend into respective alignment apertures of the first and second clamp elements along an alignment axis offset from the locking axis. A contact interface between the alignment element and the first or second clamp element is inclined with respect to the alignment axis. The separate units may be racks, lockers, HVAC units, building elements, or the like.

14 Claims, 10 Drawing Sheets

(58) Field of Classification Search
CPC ...... F16B 12/14; F16B 12/20; F16B 12/2009; F16B 12/30; F16B 12/32; Y10T 403/1616; Y10T 403/1624; Y10T 403/75; Y10S 403/10; Y10S 403/12
USPC ............ 403/13, 14, 408.1, DIG. 10, DIG. 12
See application file for complete search history.

(56) References Cited

U.S. PATENT DOCUMENTS

| | | | | |
|---|---|---|---|---|
| 4,227,826 | A | 10/1980 | Conrad | |
| 4,292,003 | A * | 9/1981 | Pond | F16B 5/10 403/231 |
| 5,713,175 | A * | 2/1998 | Mitchell | E04F 15/10 52/584.1 |
| 6,685,385 | B1 * | 2/2004 | Ledingham | F16B 2/065 403/3 |
| 2012/0016418 | A1 | 1/2012 | Chin et al. | |
| 2013/0058639 | A1 | 3/2013 | Galik | |

* cited by examiner

CLAMPING DEVICE

TECHNICAL FIELD

The present disclosure relates to a clamping device for aligning two separate units, such as racks, cabinets or lockers, in space.

BACKGROUND

In certain situations, it is desirable to align two or more separate units, such as racks or lockers, in space. In one general solution, this is done by means of a two-part bracket where each part is adapted to connect to one another by means of a locking mechanism. By mounting one bracket part to a first separate unit and another bracket part to a second separate unit, the two separate units may be aligned in space by connecting the two bracket parts and locking them together. Since the two separate units may need to be aligned not only in terms of distance of each other but also aligned in terms of an angle with a horizontal and/or vertical plane, the two-part bracket must be adequately adapted to allow alignment in at least two degrees of freedom, preferably in three dimensions. Two- or three-directional alignment can be enabled by adapting the geometry of one or more connecting surfaces of the two bracket parts adapted to connect to each other, for instance by adapting one or more connection surfaces to be angled with respect to a mounting plane. However, even with such solutions, it may still be cumbersome to adequately align separate units in space in a satisfactory manner.

There is thus a need for an improved solution that facilitates alignment of separate units in space in at least two directions and preferably in three directions.

SUMMARY

It is an object of the present invention to provide an improved solution that alleviates the mentioned drawbacks with present solutions. A first object of the invention is to provide a clamping device that enables alignment in three perpendicular directions. This object is solved by the invention of claim 1. A second object of the invention is to provide a clamping device that facilitates alignment in space. The second object is also solved by the invention of claim 1. A third object of the invention is to provide a clamping device that is durable. The third object of the invention is also solved by the invention of claim 1. The embodiments defined by the dependent claims present further improvements of the invention of claim 1.

According to a first aspect of the invention, a clamping device for aligning separate units in space is provided. The clamping device comprises: a first clamp element and a second clamp element, each adapted to be mounted to a respective separate unit; a locking element adapted to press the first clamp element and the second clamp element towards each other along a locking axis; an alignment element adapted to, when the locking element is pressing the first and second clamp elements towards each other, at least partially extend into respective alignment apertures of the first and second clamp elements along an insert alignment axis offset from the locking axis, wherein a contact interface between the alignment element and the first or second clamp element is inclined with respect to the insert alignment axis.

By this invention, the first object of the invention stated above is solved in the following manner. During use, the first and second clamp element are each mounted to a respective separate unit. The locking element is then applied to the first and second clamp element such that it presses the first and second clamp element toward each other along the locking axis A into a clamped state. By this, the first and second clamp element are at least axially fixed to each other along the locking axis A in a fixed position. The alignment element is also applied to the first and second clamp element such that it extends into said respective alignment apertures of the first and second clamp element along the alignment axis B. The alignment axis B is offset from the locking axis A. This prevents the first and second clamp element from rotating relative each other about the locking axis A. The alignment element also contributes to preventing the first and second clamp element from moving relative each other in two mutually directions perpendicular to the locking axis A. Consequently, in the clamped state, the first and second clamp element may become fixed relative each other in three perpendicular directions. The contact interface between the alignment element and the first or second clamp element is inclined with respect to the alignment axis B. This may cause the alignment element to axially align with the respective apertures of the first and second clamp element as the alignment element is pushed towards and into said apertures so that it can be readily inserted into said apertures. As the alignment element is moved toward and inserted into said apertures, this may force the first and second clamp element to align with each other in three perpendicular directions, thereby solving the first object of the invention.

Moreover, the inclined contact interface may facilitate the alignment element to be adequately inserted into the apertures of the first and second clamp element. Thus, the invention facilitates alignment also, thereby solving the second object of the invention.

In addition, by fixing the first and second clamp element relative each other along two axes, the locking axis A and the alignment axis B, the invention is more durable, thereby solving the third object of the invention.

By separate unit, it may be meant a rack, a locker, a HVAC unit, a building element or the like. The clamping device may align two or more of such separate units in space.

By toward each other, it may mean that the first and second clamp element come in direct contact with each other or remain separated by means of one or more distance elements.

The first clamp element may have a substantially planar mounting side. The alignment aperture of the first clamp element may be adapted in shape such that it extends axially in a direction parallel to the mounting side. The alignment aperture of the first clamp element may be adapted in shape such that it extends axially in a direction parallel to a mounting plane defined by the surface of the mounting side of the first clamp element and/or a mounting surface of a first separate unit to which the first clamp element is to be arranged to.

The second clamp element may have a substantially planar mounting side. The alignment aperture of the second clamp element may be adapted in shape such that it extends axially in a direction parallel to the mounting side. The alignment aperture of the second clamp element may be adapted in shape such that it extends axially in a direction parallel to a mounting plane defined by the surface of the mounting side of the second clamp element and/or a mounting surface of a second separate unit to which the second clamp element is to be arranged to.

The first clamp element may be adapted to be arranged to a first separate unit by means of fastening means. The second clamp element may be adapted to be arranged to a second separate unit by means of fastening means. Fastening means may include screws, nuts and bolts, or the like. The first and/or second clamp element may be provided with one or more openings to receive such fastening means. The first clamp element and/or the second clamp element may be formed integrally with a separate unit.

The first and second clamp element may be formed in a metallic material, a plastic material or any other suitable material.

The locking element is adapted to press the first clamp element and the second clamp element towards each other along a locking axis A. The locking element may be adapted to extend into the first and second clamp element via respective locking apertures. The locking apertures of the first and second clamp element may or may not be radially connected with respective alignment apertures of the first and second clamp element. The locking element may be adapted to be arranged on an outside of the first and second clamp element to press these toward each other.

The locking element may be adapted to press the first clamp element and the second clamp element into direct contact with each other along the locking axis A.

The clamping device may be adapted such that the locking axis A is parallel to the alignment axis B.

The clamping device may be adapted such that the first clamp element and the second clamp element are substantially symmetric in shape and size. The first and second clamp elements may be identical in shape and size.

The locking element may be configured to, when pressing the first and second clamp elements toward each other, cause the alignment element to move into the alignment apertures of the first and second claim elements to align the two separate units in directions perpendicular to the locking axis and/or alignment axis.

The contact interface may be at least partly defined by geometric shape of the alignment element. The contact interface may be at least partly defined by geometric shape of one or more alignment apertures. The alignment element and/or the one or more alignment apertures may be inclined with respect to the alignment axis by an angle of 20-25, 25-30,30-35, 35-40, 40-45, 45-50, 50-55, 55-60, 60-65, 65-70 degrees. Preferably, the angle may be 25-65 degrees, more preferably 40-50 degrees.

The contact interface may extend in a direction about the alignment axis. The contact interface may be provided by one or more contact locations between the alignment element and the first and/or second clamp element. The one or more contact locations may be two or four, each pair located on opposing sides of the alignment axis. The contact interface may extend at least partly or wholly in a circumferential direction about the alignment axis. The contact interface may be one continuous contact interface.

According to one embodiment, the alignment element extends at least partially into said respective alignment apertures by means of one or more protrusions, wherein the inclined contact interface is at least partly defined by a tapered portion of one of said one or more protrusions of the alignment element. By this, it may facilitate the alignment element to be inserted into said respective alignment apertures in a satisfactory manner. The cross-sectional area of an outermost end of the one or more protrusion may be smaller than the cross-sectional area of the alignment aperture and increase to a portion where the cross-sectional area is constant. This tapered portion facilitates the alignment element into the alignment aperture and further successively push onto the boundary of the respective alignment apertures such that the first and second clamp element align accordingly. The protrusion may have a cross-section being circular or oval or elliptical. The tapered portion may be cone shaped.

According to one embodiment, the tapered portion may extend along at least 5%, at least 10%, at least 20%, at least 30% or at least 40% of the extension of the one or more protrusions. Out of the total extension of the one or more protrusions, the tapered portion may constitute at least 5%, at least 10%, at least 20%, at least 30% or at least 40% thereof. With such extension, the tapered portion may provide the necessary inclination to the contact interface between the alignment element and the first or second clamp element. The level of extension of the tapered portion may define the angle of the inclination in the contact interface.

According to one embodiment, the alignment element comprises two protrusions adapted to engage with respective alignment apertures of the first clamp element and the second clamp element. By this, the alignment element may more easily align the first and second clamp element. The protrusions may have a circular or oval cross-section.

According to one embodiment, one or more alignment apertures of the first clamp element and the second clamp element are oval in cross section, and the respective one or more protrusions of the alignment element has a portion with a corresponding cross-sectional size and shape. By this, the first and second clamp element may be held fixed by the alignment element when inserted into these.

According to one embodiment, the first clamp element and the second clamp element each comprises an alignment recess adapted in shape and size to at least partly receive the alignment element, wherein the one or more alignment apertures are provided in the alignment recess. By this, the alignment element may be guided more easily into position with the first and second clamp element.

According to one embodiment, the locking element is adapted to extend into respective locking apertures of the first and second clamp element. By this, the clamping device may be more compactly formed.

According to one embodiment, the locking element is adapted to also extend through a locking aperture of the alignment element. By this, the locking element may also fixate the adjustment element into position while engaging with the first and second clamp element.

According to one embodiment, the locking element comprises a locking bolt and a locking nut. By this the first and second clamp element may be easily fixated to each other while also acting as a means to lock the alignment element in place if provided with a corresponding locking aperture.

According to one embodiment, the locking aperture and two alignment apertures of the respective first and second clamp element are aligned along a direction perpendicular to the locking axis A, and the locking aperture is arranged between the two alignment apertures. By this arrangement, the clamping device may be more compactly formed as it does not require to extend out as much from the separate unit when arranged thereto.

According to one embodiment, either the first clamp element or the second clamp element, or both, comprises a guiding portion adapted to guide the locking element into the respective locking apertures. Each may comprise such a guiding portion. A such guiding portion may be adapted in shape and size to define one or more contact surfaces which are inclined with respect to the locking axis A. As such, they may guide the locking member into and/or through the locking apertures of the first and second clamp element.

According to one embodiment, the guiding portion comprises at least two contact surfaces which are inclined with respect to the locking axis A and wherein at least two contact surfaces are arranged on opposite sides of the locking aperture. This may further facilitate the locking element to be guided into and/or through the locking apertures of the first and second clamp element. The guiding portion may comprise four such contact surfaces arranged symmetrically about the locking aperture.

According to one embodiment, the guiding portions of the first clamp element and the second clamp element are each adapted in shape and size to receive either the locking bolt or the locking nut. This allows the locking bolt to be inserted from either direction of the clamping device and the locking nut correspondingly arranged on the opposite side.

According to one embodiment, the clamping device comprises a locking element cap adapted in shape and size to be at least partly received in the alignment recess of either the first clamp element or the second clamp element to engage with the locking element in the locking position. The locking element cap may in particular be adapted to receive the locking nut in a rotationally fixed manner. This allows for the locking bolt to engage with the locking nut accordingly into a locked position without the use of a wrench or other separate tool.

According to one embodiment, the alignment recesses of the first clamp element and the second clamp element are each adapted in shape and size to receive either the alignment element or the locking element cap. This provides the advantage of a more versatile clamping device.

According to one embodiment, the one or more protrusions of the alignment element is adapted with a first portion having a cross section corresponding in shape and size to the cross section of the alignment aperture of the first clamp element and the second clamp element, and a second portion having a cross section with a cross section area smaller in size than the area of the cross section of the first portion.

According to one embodiment, the second portion tapers in cross sectional size from the first portion towards an end of the protrusion.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein.

DESCRIPTION OF EMBODIMENTS

Figure 1:
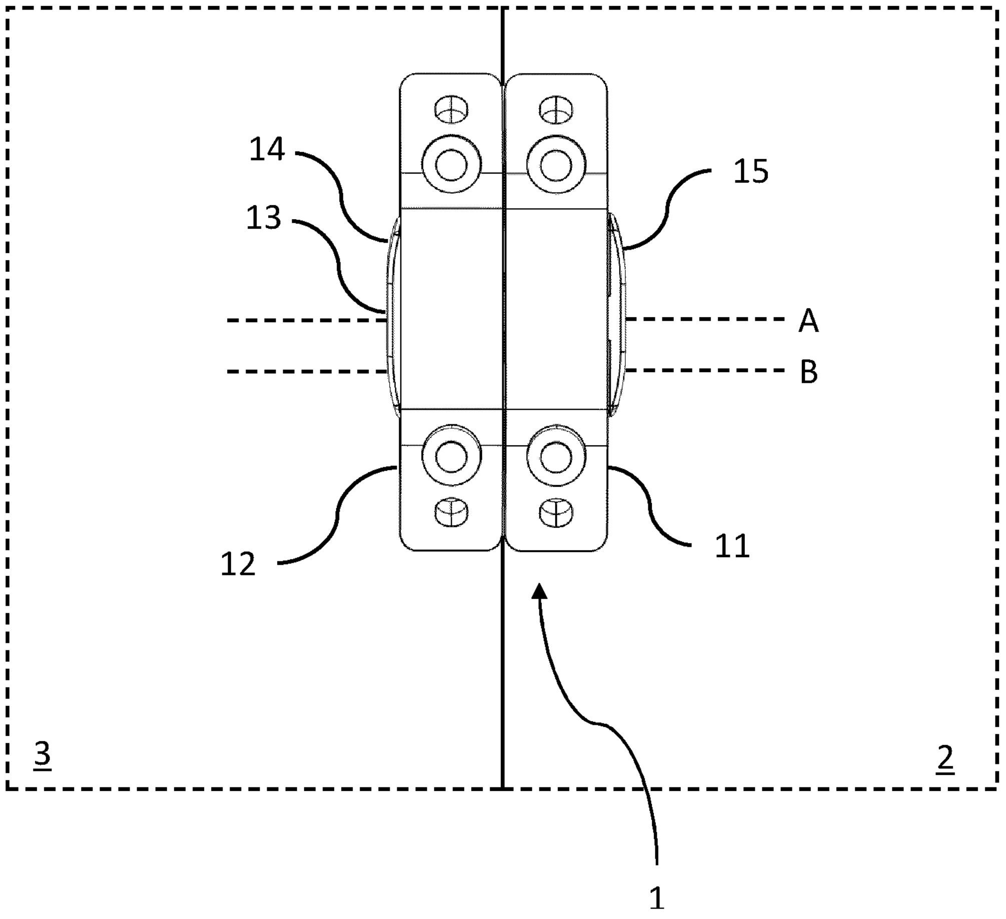
FIG. 1 shows a schematic view of the clamping device according to one embodiment of the invention when arranged accordingly to two separate units.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 shows a schematic view of the clamping device 1 according to one embodiment of the invention when arranged accordingly to two separate units 2, 3. The separate units 2, 3 may be racks, cabinets, lockers, HVAC units, building elements or the like. The clamping device 1 comprises a first clamp element 11 and a second clamp element 12. The first clamp element 11 is adapted to be arranged to a first separate unit 2. The second clamp element 12 is adapted to be arranged to a second separate unit 3. The clamping device 1 is adapted to be adjustable between a clamped state in which state the first and second clamp elements 11, 12 are pressed toward each other into a fixed position relative each other, and an unclamped state where the first and second clamp elements 11, 12 are freely movable relative each other. In the clamped state, when in use, the clamping device 1 causes the separate units 2, 3 to align accordingly in space.

In order to keep the clamping device 1 in the clamped state, the clamping device 1 further comprises a locking element 13. The locking element 13 is adapted to press the first clamp element 11 and the second clamp element 12 towards each other along a locking axis A into the clamped state and keep it in the clamped state until the locking element 13 is released. The locking element 13 may be adapted to extend through the first and second clamp element 11, 12, or extend along an outward face thereof, into a locking position where it presses the first and second clamp element 11, 12 toward each other, thereby fixing them together in a fixed position. In the exemplary embodiment shown in FIG. 1, the clamping device 1 is adapted to press the first clamp element 11 and the second clamp element 12 into contact with each other along the locking axis A by means of a locking element 13 comprising a locking bolt 131 and a locking nut 132. Moreover, the clamping device 1 is adapted such that the interface between the first and second clamp element 11, 12 when in contact with each other is perpendicular to the locking axis A.

The clamping device 1 further comprises an alignment element 14 adapted to, when the locking element 13 is pressing the first and second clamp elements 11, 12 towards each other, at least partially extend into respective alignment apertures (not shown in FIG. 1) of the first and second clamp elements 11, 12 along an alignment axis B offset from the locking axis A. The alignment element 14 enables the first and second clamp element 11, 12 to be aligned in a desirable manner when being moved to the fixed position. As shown in FIG. 1, the clamping device 1 may be adapted so that the locking axis A and the alignment axis B are parallel to one another. The alignment element 14 may be held into position by means of the locking element 13 also.

Figure 1A:
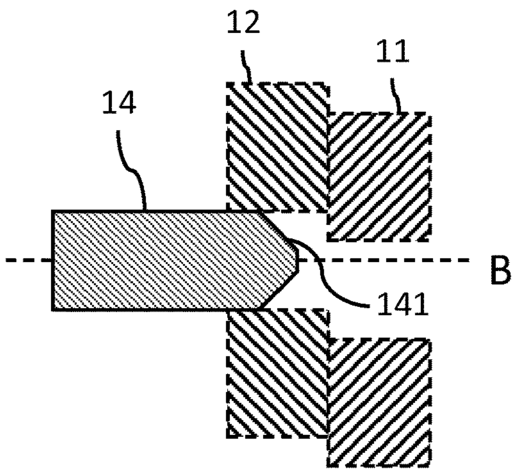
FIGS. 1A-1D show schematic views of a cross section of at least a portion of the clamping device according to one embodiment of the invention.
Figure 1B:
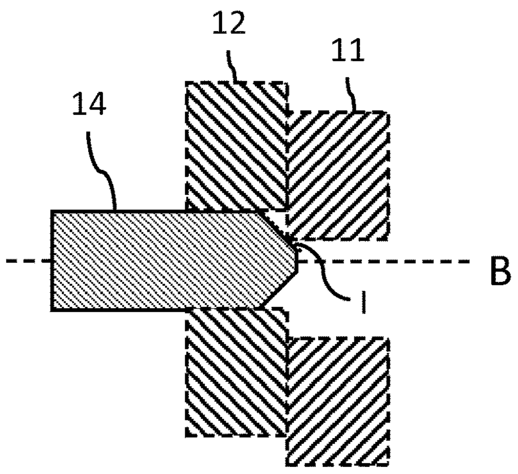
Figure 1C:
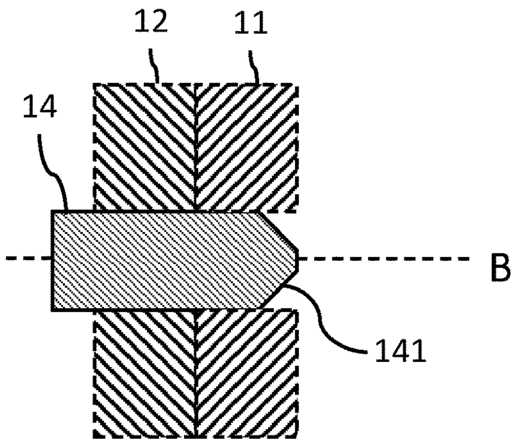
Figure 1D:
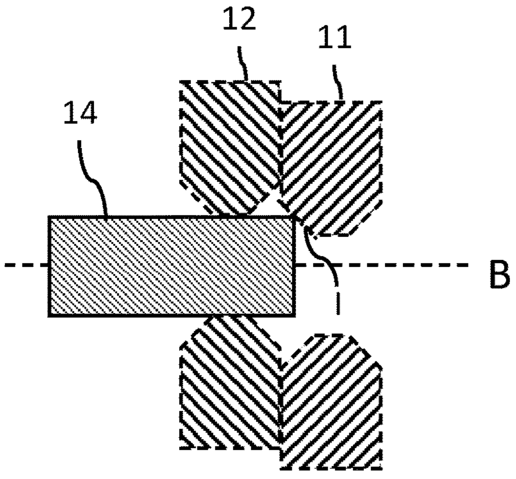

FIGS. 1A-1D show schematic views of a cross section of at least a portion or portions of the clamping device according to one embodiment of the invention. In FIG. 1A, the alignment element 14 is inserted into the alignment aperture of a first clamping element 12 which is slightly non-aligned with a second clamping element 11. The alignment element 14 further comprises a tapered portion 141 which is angled with respect to the alignment axis B. When the alignment element 14 is moved further into the alignment aperture of the first clamp element 12, the alignment element 14 eventually comes in contact with the second clamping element 11 via a contact interface I. The contact interface I is defined by the geometry of the alignment element 14 and the first and/or second clamp element 11, 12, and in the exemplary embodiment shown in FIGS. 1A-1C, it is at least partly defined by the tapered portion 141. When the alignment element 14 is pressed further, the second clamp element 11 aligns itself relative the first clamp element 12 under influence of the contact interface I which is inclined relative the alignment axis B. In FIG. 1C, the first and second clamp element are aligned. Alternatively, the inclined contact interface I may be provided by one or more inclined portions bounding the alignment apertures as shown in FIG. 1D. In addition, both the alignment element 14 and the first and/or second clamp element 11, 12 may be adapted with tapered and/or inclined portions by which the inclined contact interface I is at least partly defined. E.g. the clamping device 1 could comprise an alignment element 14 with a tapered portion 141 as shown in FIGS. 1A-1C and the first and/or second clamp element could be provided with alignment aperture geometrically defined with inclined wall portion(s) as illustrated in FIG. 1D.

Figure 2:
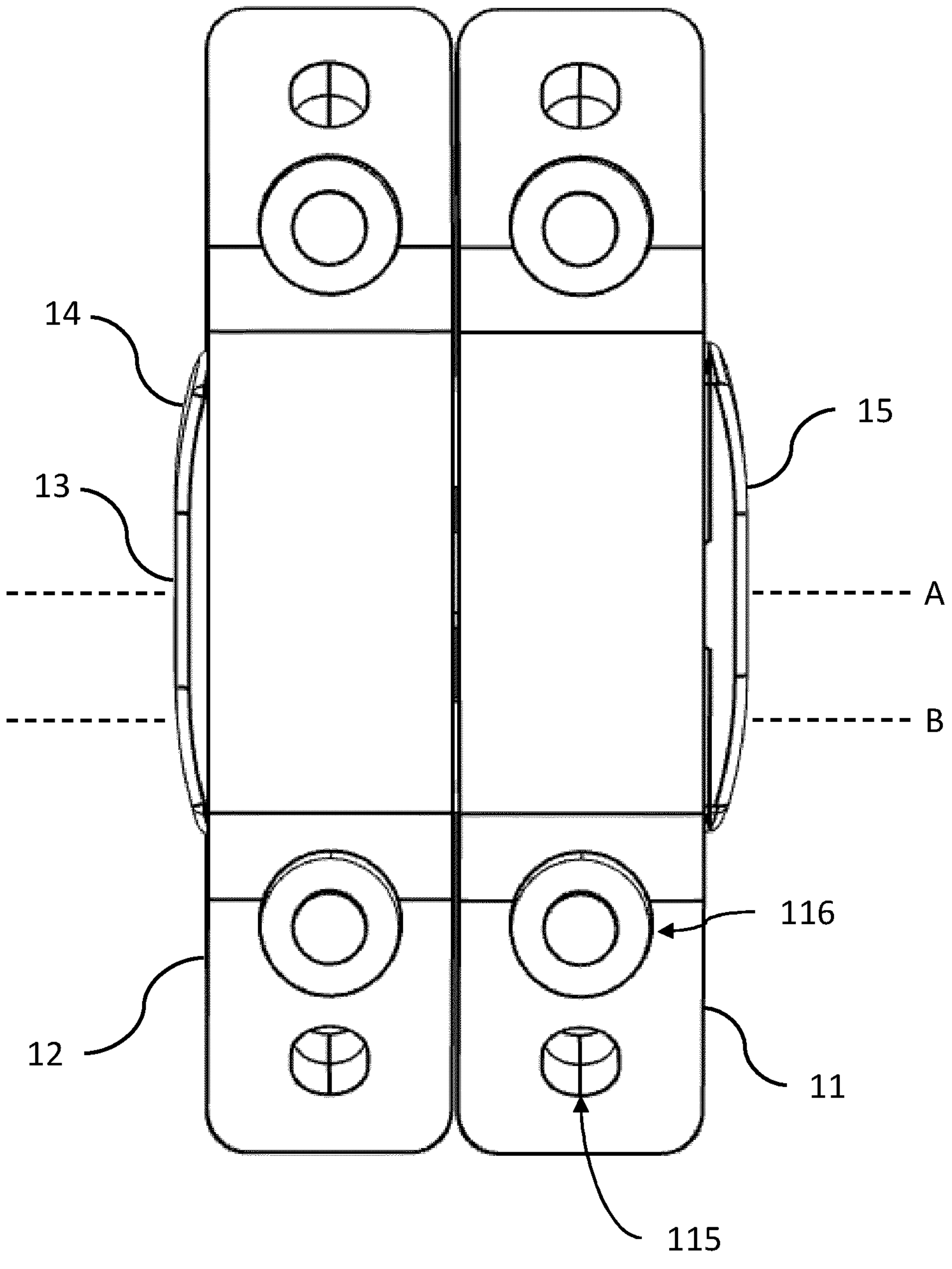
FIG. 2 shows a front view of the clamping device according to one embodiment of the invention.

FIG. 2 shows a schematic front view of the clamping device according to one embodiment of the invention. Here, the clamping device 1 is shown with two sets of openings 115, 116 for receiving fastening means provided on each clamp element 11, 12 by which the first and second clamp element 11, 12 are fastened to the respective first and second separate units 2, 3 provided with corresponding openings to receive the fastening means. However, it is to be understood that the number and position of openings for receiving fastening means are optional; in fact, the first and second clamp element 11, 12 may be adapted to be arranged to separate units 2, 3 by other means in which case no such openings would be required. As a non-limiting example, the clamp elements 11, 12 of the clamping device 1 may be provided with protrusions adapted to connect with the respective first and second separate unit 2, 3 in some predetermined manner.

Figure 3A:
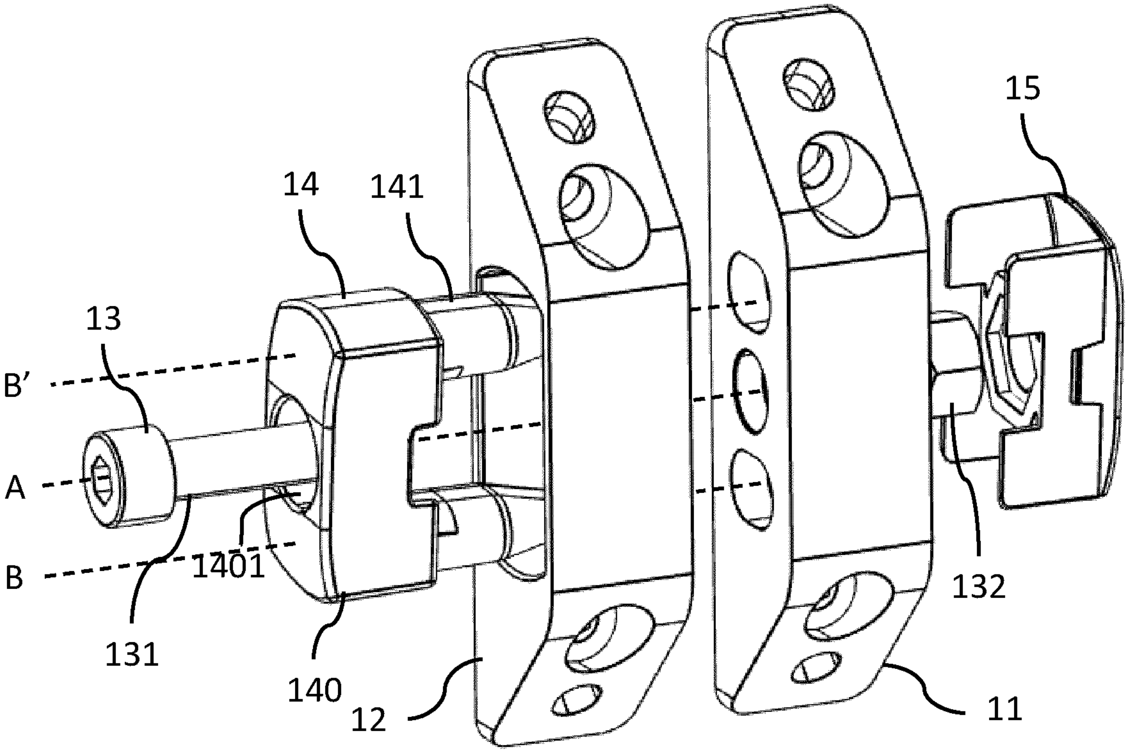
FIGS. 3A and 3B show exploded views of the clamping device according to one embodiment of the invention.
Figure 3B:
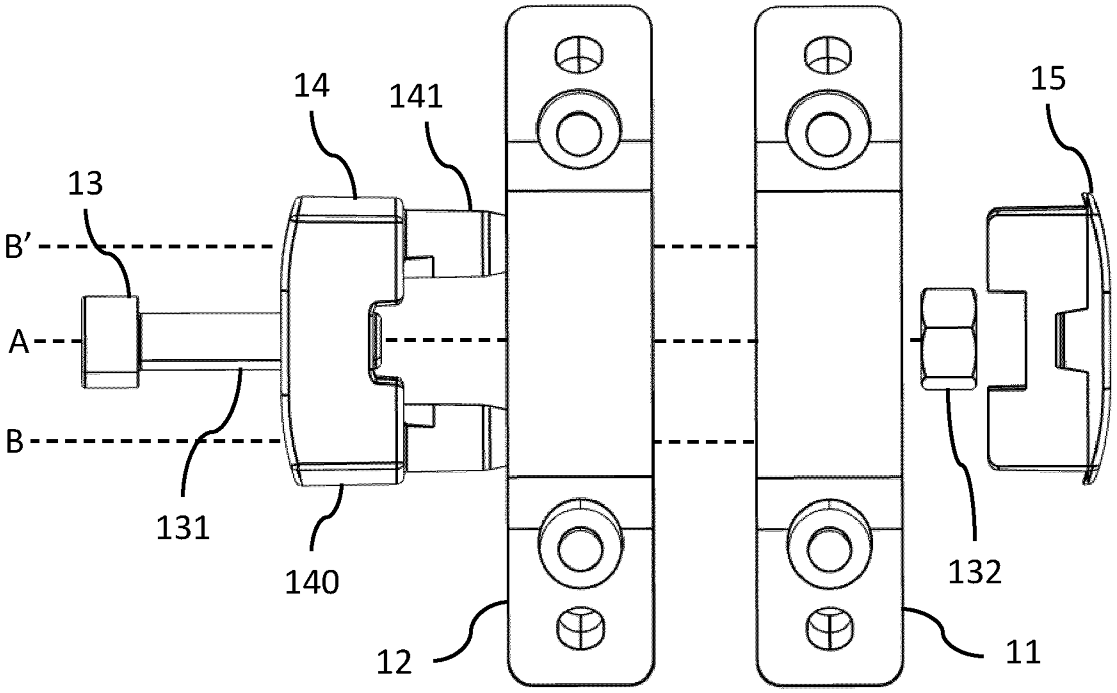

FIGS. 3A and 3B show exploded views of the clamping device 1 according to one embodiment of the invention. In this particular embodiment, the first and second clamp element 11, 12 are each provided with a substantially similar oblong shape with a planar mounting face adapted to face the separate unit 2, 3 when the corresponding first and second clamp element 11, 12 are arranged thereto. The first and second clamp element 11, 12 also each have an inward facing side face and an outward facing side face. In the clamped state, the inward facing side faces of the first and second clamp element 11, 12 are facing each other and optionally placed into contact with each other. The first and second clamp element 11, 12 also each have an outward facing side face which, when the clamping device is in the clamped state, is facing in opposite directions. The respective inward facing side face and the outward facing side face of each clamp element 11, 12 are facing opposite directions. As will be shown in the following figures, the clamping device 1 may be adapted so that the respective inward facing side faces and the respective outward facing side faces of the first and second clamp element are substantially identical. Each of the first and second clamp element 11, 12 also have an outward facing face adapted to face away from the separate unit when arranged thereto.

In the embodiment shown in FIGS. 3A and 3B, the locking element 13 comprises a locking bolt 131 and a locking nut 132. The locking bolt 131 is adapted to extend into respective locking apertures of the first clamp element 11 and the second clamp element 12 along locking axis A. The locking nut 132 is then arranged accordingly to the locking bolt 131 when extending into said locking apertures of the first and second clamp element 11, 12 to press them toward each other into a fixed position. The locking bolt 131 is arranged to extend through a first clamp element 11, 12 via the outward facing side face and the inward facing side face and at least through the inward facing side face of the other clamp element 12, 11 of the first and second clamp element 11, 12. The locking bolt 131 may also extend through the outward facing side face of the other clamp element 12, 11 also.

In one embodiment, as illustrated in the figures, the alignment element 14 comprises a body 140 and two protrusions 141, 142 extending out of the body 140. The two protrusions 141, 142 are adapted to extend into respective alignment apertures 112*a*, 122*a*; 112*b*, 122*b* of the first and second clamp element 11, 12. Moreover, the body 140 of the alignment element 14 is provided with an aperture 1401 through which the locking element 13 is adapted to extend also. Thus, the locking element 13 is adapted to extend through the alignment element 14, a first clamp element 11, 12 and at least partly into a second clamp element 12, 11 when the locking element 13 is arranged to press the two clamp elements 11, 12 toward each other. In addition, the first and second clamp element 11, 12 are each adapted with an alignment recess 113, 123 adapted in shape and size to at least partly receive the alignment element 14. The respective locking apertures 111, 121 and the alignment apertures 112*a*, 112*b*; 122*a*, 122*b* are each provided in the alignment recess 113, 123 of the first and second clamp element 11, 12. Specifically, the alignment recess 113, 123 is provided with an oblong shape corresponding to the shape of the body 140 of the alignment element 14. The alignment element 14 can thus be arranged into either of the first and second clamp element 11, 12, which results in a more versatile clamping device 1.

Figure 4A:
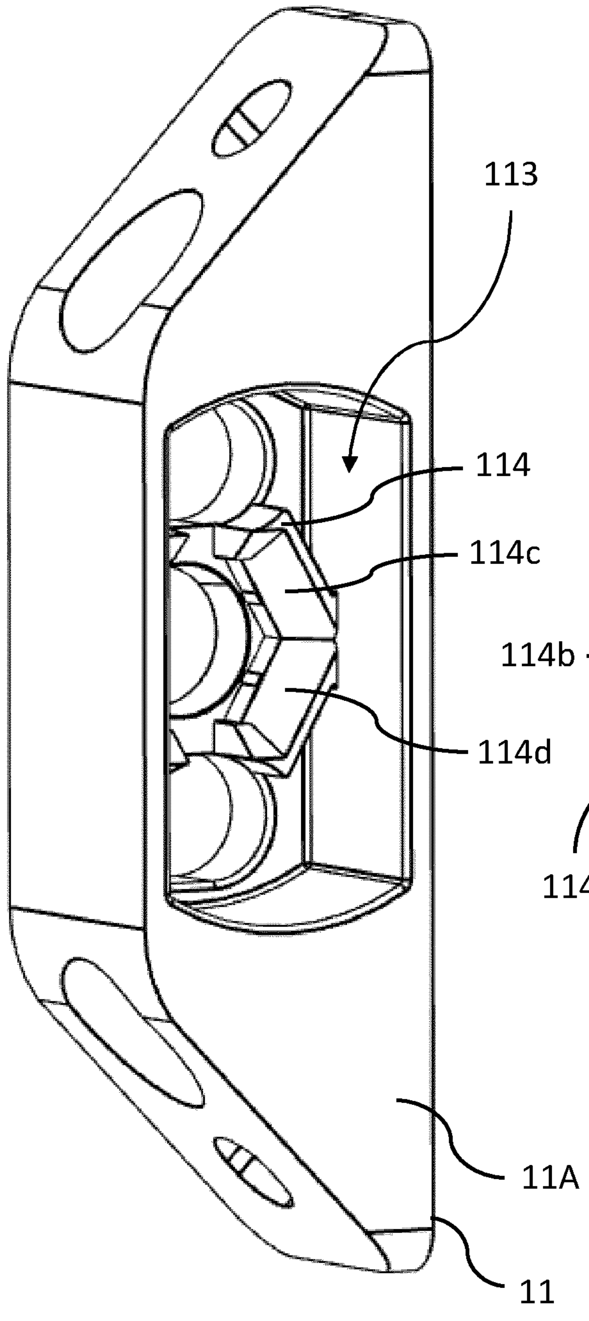
FIGS. 4A-4D show various views of a first clamp element according to one embodiment of the invention.
Figure 4B:
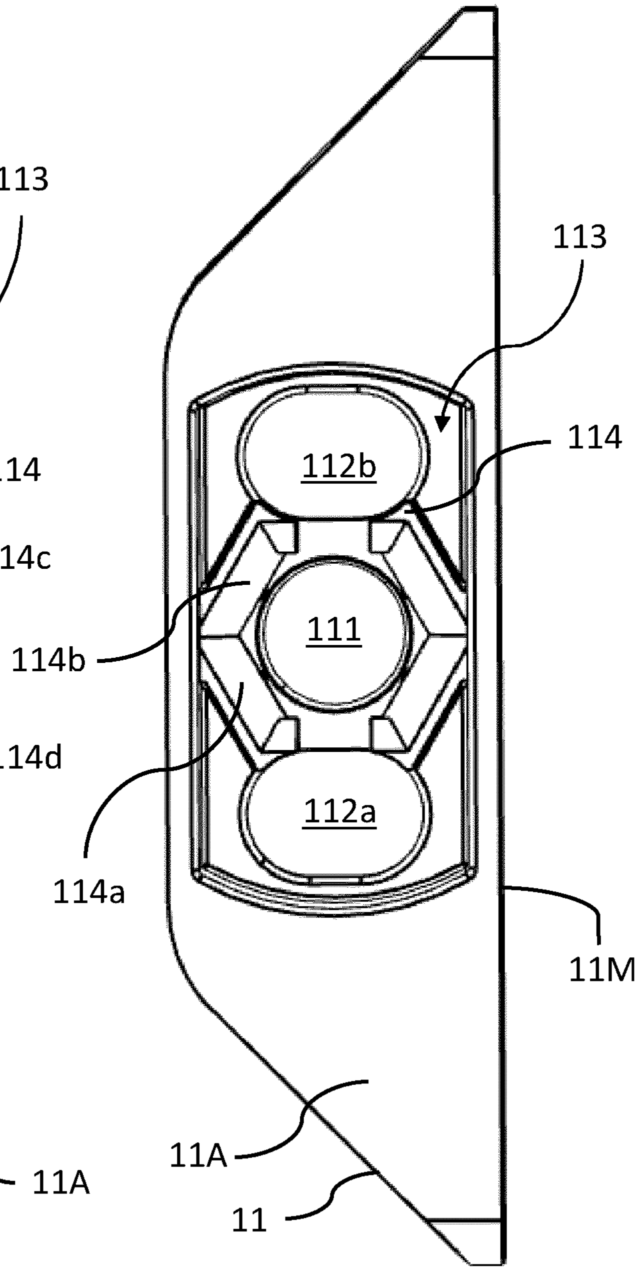

FIGS. 4A and 4B show the outward facing side face 11A of a first clamp element 11. The clamp element 11 comprises an alignment recess 113 adapted in shape and size to receive the body 140 of the alignment element 14. The locking aperture 111 is arranged at the bottom of said alignment recess. Adjacent to the locking aperture 111, a guiding portion 114 is arranged which has the purpose of guiding the locking element 13 into said locking aperture 111. The guiding portion 114 comprises a plurality of contact surfaces 114*a*, 114*b*, 114*c*, 114*d* arranged around the locking aperture 111. The contact surfaces 114*a*, 114*b*, 114*c*, 114*d* are inclined with respect to the locking axis A such that they facilitate the locking element 13 to be guided into the locking aperture 111. Adjacent to the locking aperture 111, two alignment apertures 112*a*, 112*b* are arranged. They have a cross section that corresponds in size and shape to a cross sectional portion of the respective protrusions 141, 142 of the alignment element 14. A guiding portion is provided in one or both of the clamp elements 11, 12.

Figure 4C:
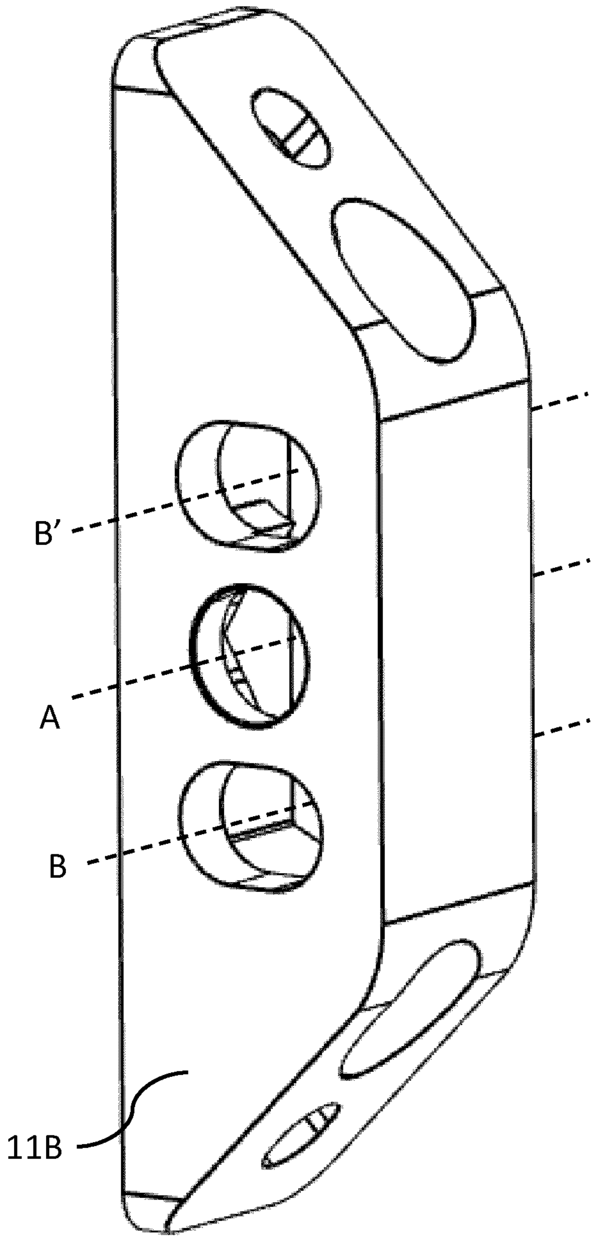
Figure 4D:
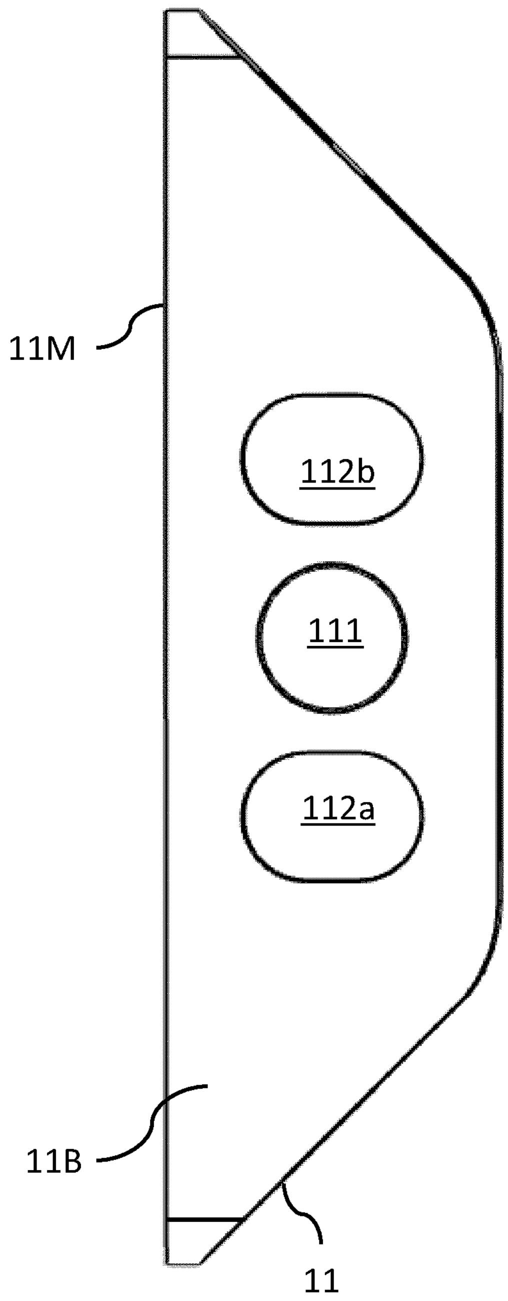

FIG. 4C and FIG. 4D show the inward facing side face 11B of the clamp element 11. The clamp element 11 is provided with a locking aperture 111 and two alignment apertures 112*a*, 112*b*. These define the locking axis A and the first and second alignment axis B, B'. In the embodiment shown, the locking aperture 111 and the first and second alignment apertures 112*a*, 112*b* are aligned along a direction perpendicular to the locking axis A. Said direction is also parallel with the mounting plane defined by the mounting face 11M of the clamp element 11. The first and second alignment apertures 112*a*, 112*b* are arranged on opposite sides of the locking aperture 111.

Figure 5A:
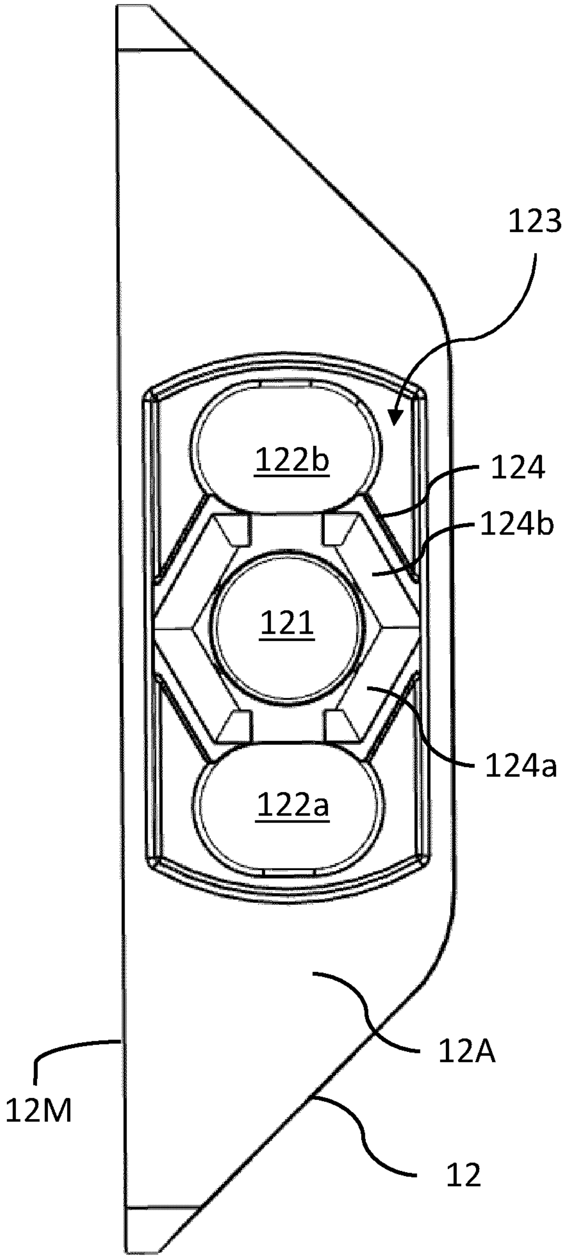
FIGS. 5A-5D show various views of a second clamp element according to one embodiment of the invention.
Figure 5B:
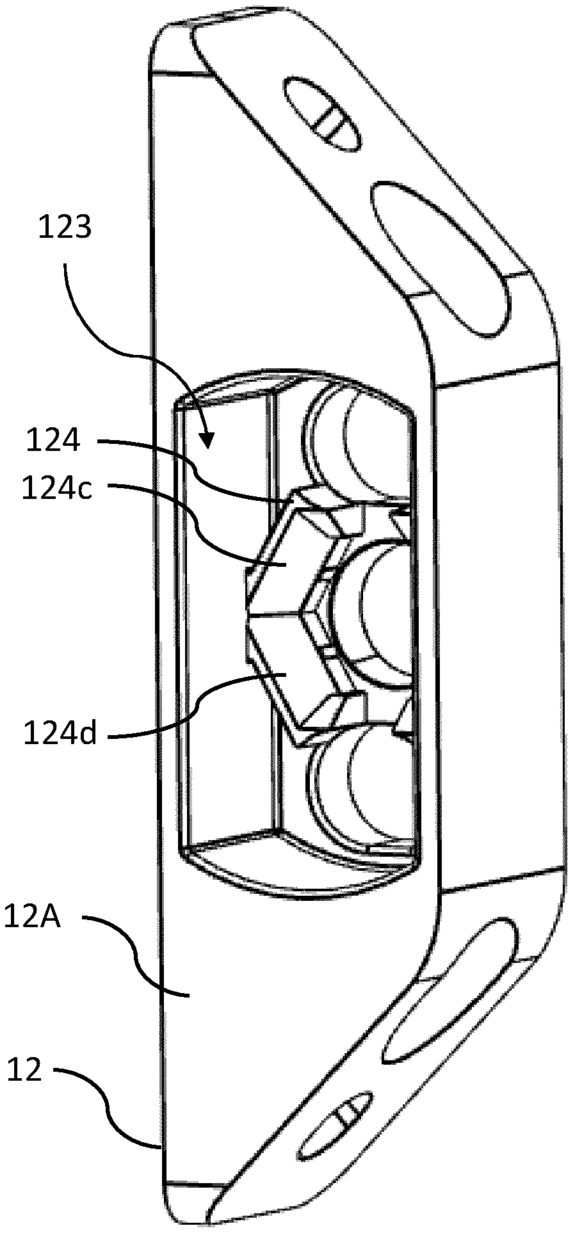

FIGS. 5A and 5B show the outward facing side face 12A of a second clamp element 12. The clamp element 12 comprises an alignment recess 123 adapted in shape and size to receive the body 140 of the alignment element 14. The locking aperture 121 is arranged at the bottom of said alignment recess. Adjacent to the locking aperture 121, a guiding portion 124 is arranged which has the purpose of guiding the locking element 13 into said locking aperture 121. The guiding portion 124 comprises a plurality of contact surfaces 124*a*, 124*b*, 124*c*, 124*d* arranged around the locking aperture 121. The contact surfaces 124*a*, 124*b*, 124*c*, 124*d* are inclined with respect to the locking axis A such that they facilitate the locking element 13 to be guided into the locking aperture 121. Adjacent to the locking aperture 121, two alignment apertures 122*a*, 122*b* are arranged. They have a cross section that corresponds in size and shape to a cross sectional portion of the respective protrusions 141, 142 of the alignment element 14.

Figure 5C:
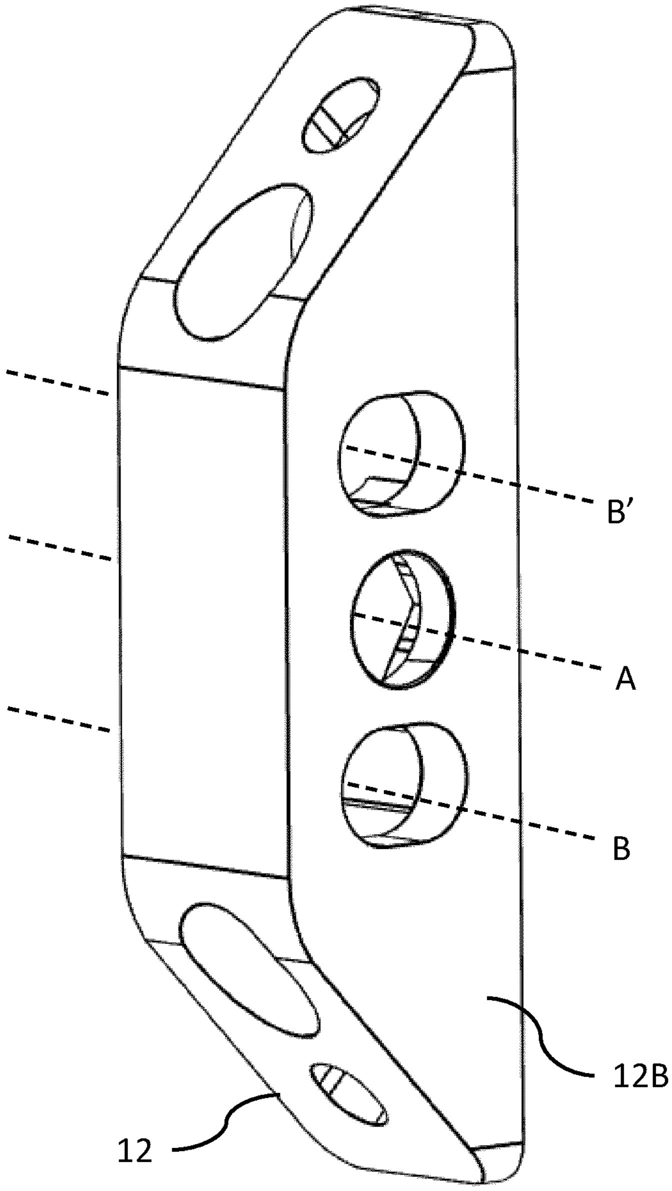
Figure 5D:
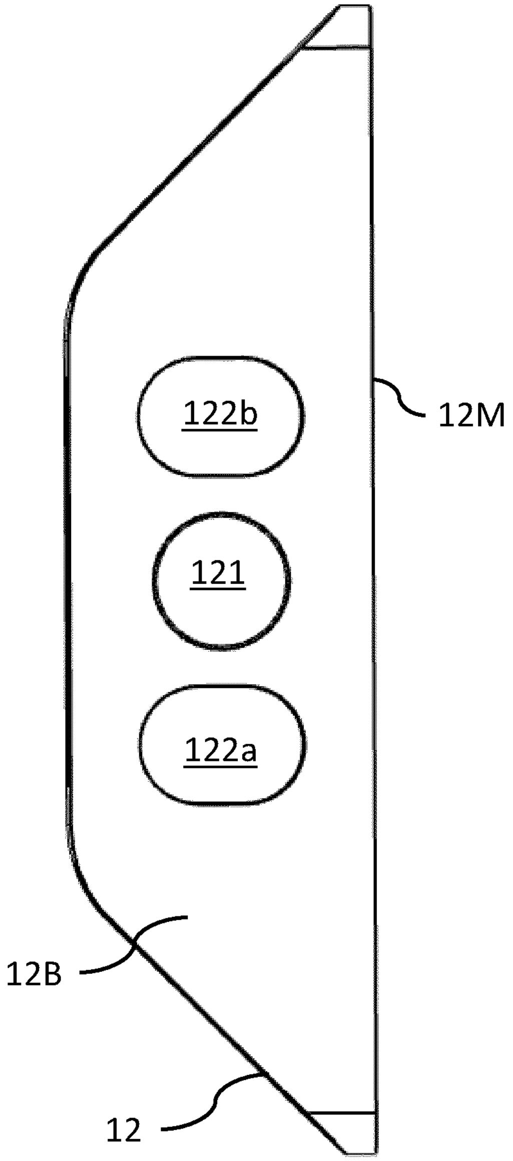

FIG. 5C and FIG. 5D show the inward facing side face 12B of the clamp element 12. The clamp element 12 is provided with a locking aperture 121 and two alignment apertures 122*a*, 122*b*. These define the locking axis A and the first and second alignment axis B, B'. In the embodiment shown, the locking aperture 121 and the first and second alignment apertures 122*a*, 122*b* are aligned along a direction perpendicular to the locking axis A. Said direction is also parallel with the mounting plane defined by the mounting face 12M of the clamp element 12. The first and second alignment apertures 122*a*, 122*b* are arranged on opposite sides of the locking aperture 121.

Figure 6A:
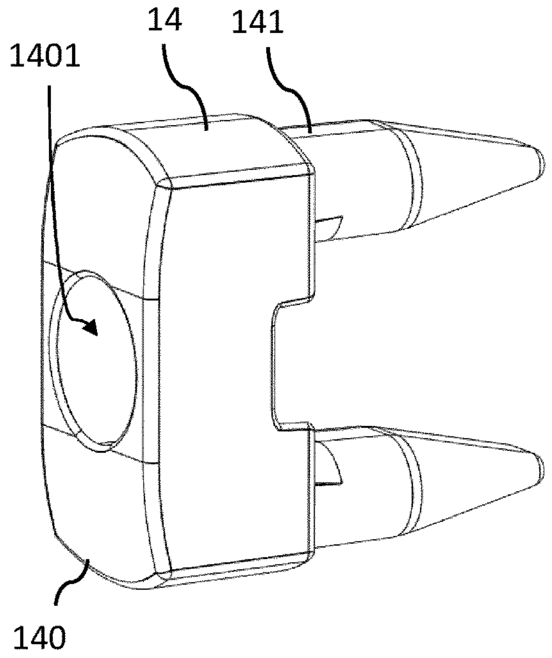
FIGS. 6A-6D show various views of the alignment element according to one embodiment of the invention.
Figure 6B:
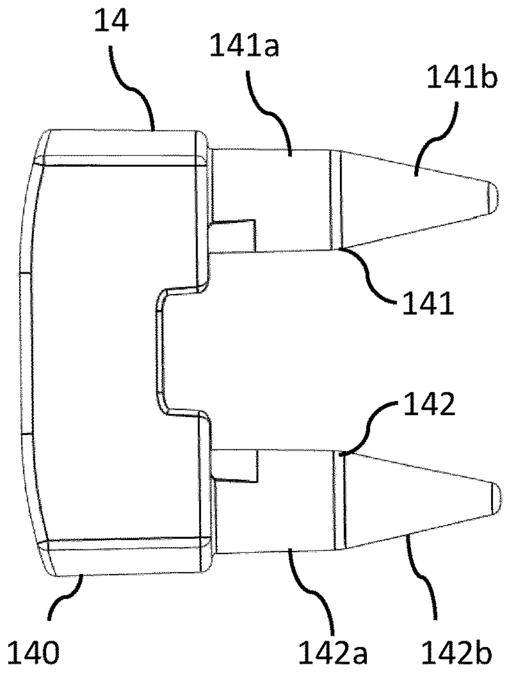
Figure 6C:
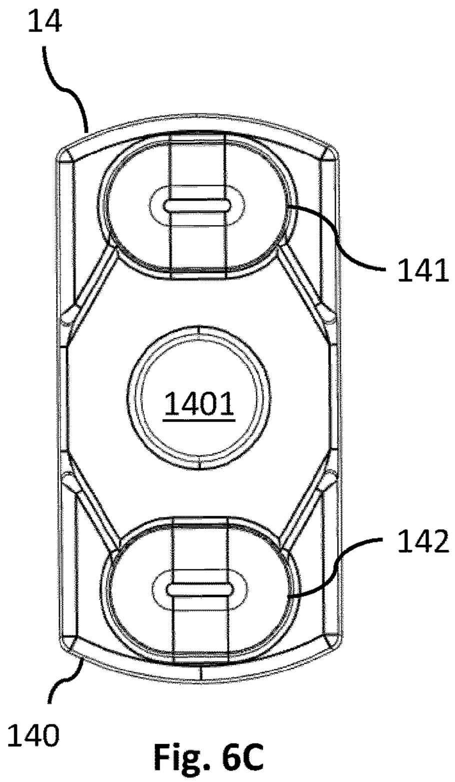
Figure 6D:
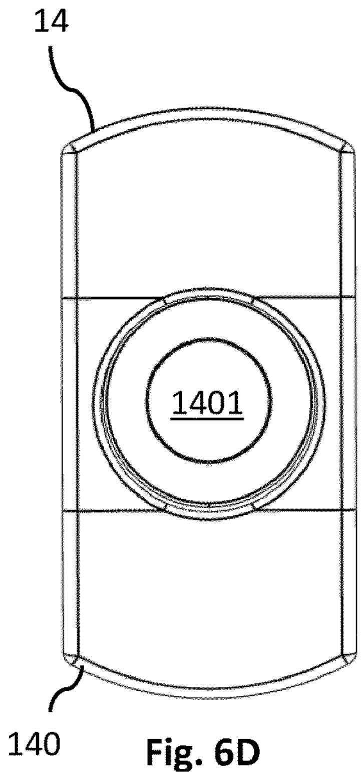
Figure 7A:
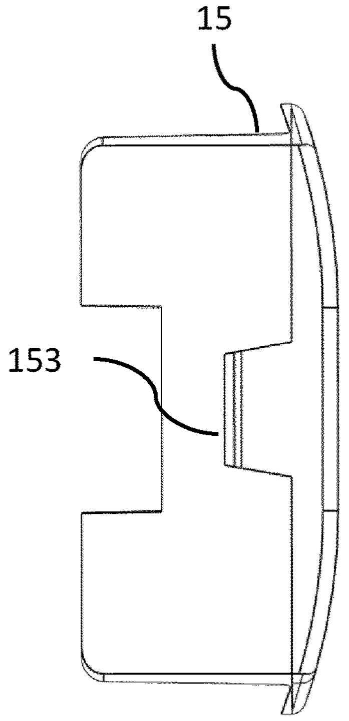
FIGS. 7A-7D show various views of the insert element locking element according to one embodiment of the invention.
Figure 7B:
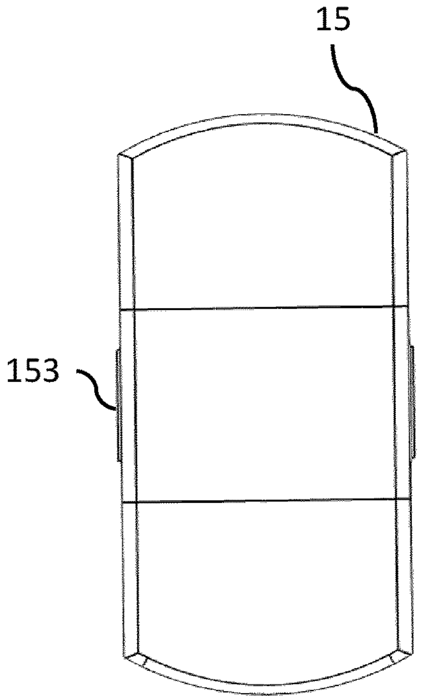
Figure 7C:
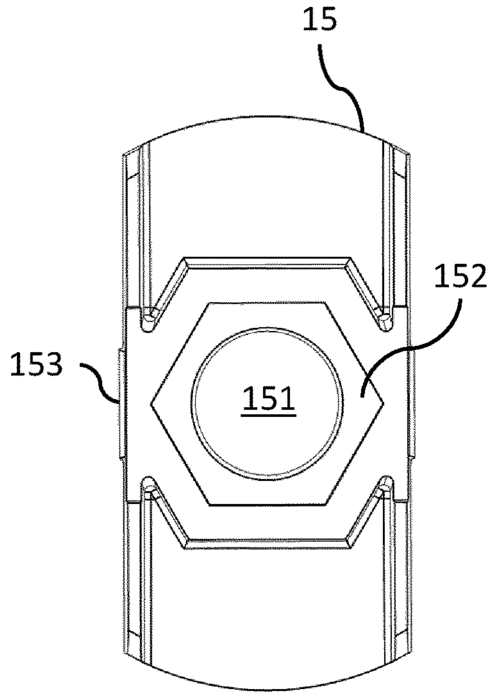
Figure 7D:
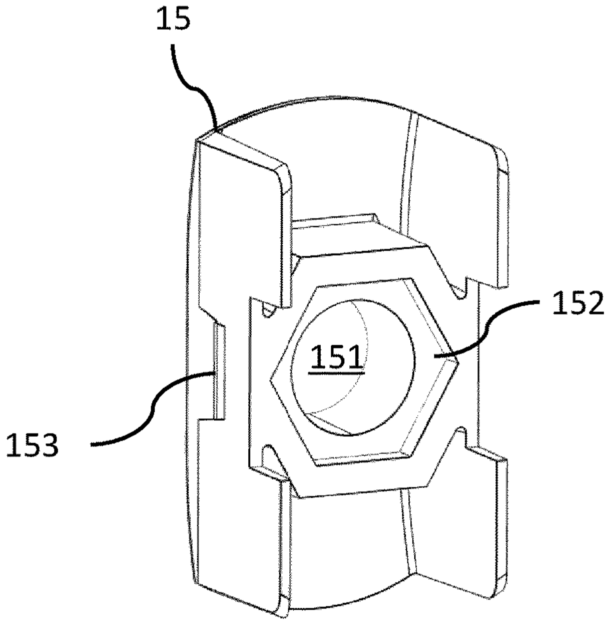

FIGS. 6A-6D show the alignment element 14 according to one embodiment of the invention. The alignment element 14 comprises a body 140 and two protrusions 141, 142 extending out from the body 140 of the alignment element 14. The two protrusions 141, 142 extend out from the same face of the body 140 in a parallel manner. The body 140 is also provided with an aperture 1401 for receiving the locking element 13. Each protrusion 141, 142 comprises a first part 141*a*, 142*a* of substantially constant cross-sectional area along their respective axial extension. As is shown in FIG. 6*c*, the cross-sectional shapes of these portions are oval. Moreover, each protrusion 141, 142 comprises a second part 141*b*, 142*b* connected to the respective first part 141*a*, 142*a* which tapers toward an axial end of the protrusions 141, 142.

FIGS. 7A-7D show a locking element cap 15 according to one embodiment of the invention. The locking element cap 15 is adapted in size and shape to be inserted into either alignment recess 113, 123 of the first or second clamp element 11, 12. The locking element cap 15 is provided with a recess 152 in which an aperture 151 is arranged. The recess 152 is adapted in shape and size to receive and rotationally fixate the locking nut 132. By this, the locking nut 132 may be held rotationally fixed while the locking bolt 131 is moved to engage it. Moreover, the locking element cap 15 comprises two flanges 153 arranged on opposite sides of the locking element cap 15. These flanges are adapted to engage with either the first or second clamp element 11, 12 to keep the locking element cap 15 inserted into the alignment recess 113, 123 of the first or second clamp element 11, 12.

Moreover, more than one clamping device 1 may be arranged to a pair of separate units. For instance, two or more clamping devices 1 can be arranged to a pair of separate units but placed a certain distance from each other. They may e.g. be arranged along a vertical axis or a horizontal axis. Two or more clamping devices 1 may likewise be arranged to a respective set of three or more separate units to be aligned in space depending on desired placement.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A clamping device for aligning separate units in space, comprising:

a first clamp element and a second clamp element, each adapted to be mounted to a respective separate unit;

a locking element adapted to press the first clamp element and the second clamp element towards each other along a locking axis;

an alignment element that is a separate component from the first clamp element, the second clamp element, and the locking element, the alignment element comprising a body and one or more protrusions extending out of the body, the body being adapted to be at least partly received in an alignment recess of either the first clamp element or the second clamp element, the alignment element is adapted to, when the locking element is pressing the first and second clamp elements towards each other, at least partially extend into respective alignment apertures of the first and second clamp elements along an alignment axis offset from the locking axis, wherein a contact interface between the alignment element and the first or second clamp element is inclined with respect to the alignment axis; and wherein the locking element is adapted to extend into respective locking apertures of the first and second clamp element, and the locking element is adapted to extend through a locking aperture provided in the body of the alignment element.

2. The clamping device according to claim 1, wherein the alignment element extends at least partially into said respective alignment apertures by one or more protrusions, wherein the inclined contact interface is at least partly defined by a tapered portion of one of said one or more protrusions of the alignment element.

3. The clamping device according to claim 2, wherein the tapered portion extends along at least 5%, at least 10%, or at least 20% of the extension of the one or more protrusions.

4. The clamping device according to claim 1, wherein the alignment element comprises two protrusions adapted to engage with respective alignment apertures of the first clamp element and the second clamp element.

5. The clamping device according to claim 1, wherein one or more alignment apertures of the first clamp element and the second clamp element are oval or elliptical in cross section, and the respective one or more protrusions of the alignment element has a portion with a corresponding cross-sectional size and shape.

6. The clamping device according to claim 1, wherein the first clamp element and the second clamp element each comprises an alignment recess adapted in shape and size to at least partly receive the alignment element, wherein the one or more alignment apertures are provided in the alignment recess.

7. The clamping device according to claim 1, wherein the locking element comprises a locking bolt and a locking nut.

8. The clamping device according to claim 1, wherein the locking aperture and two alignment apertures of the respective first and second clamp element are aligned along a direction perpendicular to the locking axis, and the locking aperture is arranged between the two alignment apertures.

9. The clamping device according to claim 1, wherein either the first clamp element or the second clamp element comprises a guiding portion adapted to guide the locking element into the respective locking apertures.

10. The clamping device according to claim 9, wherein the guiding portions of the first clamp element and the second clamp element are each adapted in shape and size to receive either the locking bolt or the locking nut.

11. The clamping device according to claim 10, wherein alignment recesses of the first clamp element and the second clamp element are each adapted in shape and size to receive either the alignment element or a locking element cap.

12. The clamping device according to claim 1, comprising a locking element cap adapted in shape and size to be at least partly received in an alignment recess of either the first clamp element or the second clamp element to engage with the locking element in the locking position.

13. The clamping device according to claim 1, wherein the one or more protrusions of the alignment element is adapted with a first portion having a cross section corresponding in shape and size to the cross section of the alignment aperture of the first clamp element and the second clamp element, and a second portion having a cross section with an area smaller in size than the area of the cross section of the first portion.

14. The clamping device according to claim 13, wherein the second portion tapers from the first portion towards an end of the protrusion.

* * * * *